(12) United States Patent  (10) Patent No.: US 8,581,152 B2
Hansen et al.  (45) Date of Patent: Nov. 12, 2013

(54) MULTI-ZONE HEATING SYSTEM

(75) Inventors: William J. Hansen, Pewaukee, WI (US); Adam Van Essen, Menomonee Falls, WI (US); Terence T. Smith, Waukesha, WI (US)

(73) Assignee: Enthermics Medical Systems, Inc., Menomonee Falls, WI (US)

( * ) Notice: Subject to any disclaimer, the term of this patent is extended or adjusted under 35 U.S.C. 154(b) by 261 days.

(21) Appl. No.: 13/018,524

(22) Filed: Feb. 1, 2011

(65) Prior Publication Data
US 2011/0198339 A1 Aug. 18, 2011

Related U.S. Application Data

(63) Continuation-in-part of application No. 12/706,267, filed on Feb. 16, 2010, now Pat. No. 8,217,316.

(51) Int. Cl.
A21B 1/00 (2006.01)
F27D 11/00 (2006.01)

(52) U.S. Cl.
USPC ............................ 219/406; 219/385

(58) Field of Classification Search
USPC ......... 219/385, 386, 387, 390, 391, 401–414; 29/592.1, 593, 610.1, 611, 613
See application file for complete search history.

(56) References Cited

U.S. PATENT DOCUMENTS

| 3,521,030 A | | 7/1970 | Maahs | |
|---|---|---|---|---|
| 3,596,351 A | * | 8/1971 | Tilton et al. | 29/611 |
| 3,697,728 A | * | 10/1972 | Stirzenbecher | 219/548 |
| 3,800,123 A | | 3/1974 | Maahs | |
| 4,063,068 A | * | 12/1977 | Johnson et al. | 219/441 |
| 4,068,572 A | | 1/1978 | Vogt | |
| 5,345,063 A | * | 9/1994 | Reusche et al. | 219/441 |
| 5,408,576 A | | 4/1995 | Bishop | |
| 5,619,613 A | | 4/1997 | Otaki | |
| 6,121,583 A | | 9/2000 | Hansen | |
| 6,570,138 B2 | | 5/2003 | Hansen et al. | |
| 2006/0289000 A1 | | 12/2006 | Naylor | |
| 2008/0023462 A1 | | 1/2008 | Shei et al. | |

FOREIGN PATENT DOCUMENTS

EP 0715826 A1 6/1996

OTHER PUBLICATIONS

International Search Report for corresponding PCT application (PCT/US2011/025006), mailed May 17, 2011.

* cited by examiner

*Primary Examiner* — Sang Paik
(74) *Attorney, Agent, or Firm* — Boyle Fredrickson, S.C.

(57) ABSTRACT

A heating system is disclosed including a cabinet, at least one heating pad subassembly, and a plurality of couplings. The cabinet has walls defining an interior heating chamber. The heating pad subassembly is disposed on an exterior surface of the walls of the cabinet and includes a heating element and a plurality of openings formed there through. The plurality of couplings includes a plurality of coupling first portions disposed on the exterior surface of the walls and a plurality of coupling second portions coupled to the plurality of coupling first portions. At least a portion of the plurality of couplings extend through the plurality of openings in the heating pad subassembly, thereby coupling the heating pad subassembly to the cabinet.

20 Claims, 6 Drawing Sheets

MULTI-ZONE HEATING SYSTEM

CROSS-REFERENCE TO RELATED APPLICATION

This application is a continuation-in-part application of U.S. patent application Ser. No. 12/706,267 filed on Feb. 16, 2010 now U.S. Pat No. 8,217,316, the entire contents of which are incorporated by reference as if set forth in its entirety herein.

STATEMENT OF FEDERALLY SPONSORED RESEARCH OR DEVELOPMENT

Not applicable.

BACKGROUND

This invention is directed at a heating system. In particular, this invention is directed at a heating cabinet with the capacity for multiple heating zones.

Heating cabinets are frequently used to warm items and maintain the items at a desired temperature for a period of time. Conventionally, heating cabinets include an interior chamber which is accessible via a door. Internal heating elements warm the items inside the chamber. To best utilize the volume of the chamber, there are often shelves or other fixtures to accommodate placement of items vertically within the cabinet.

These warming cabinets are employed across a wide number of industries. For example, in the food service industry, once food has been prepared, the prepared food may be kept warm for a length of time before the food is served. Warming cabinets provide convenient, and frequently transportable, storage for the prepared food. As another example, in the medical industry, heating cabinets are frequently used to maintain intravenous fluids at or near body temperature to maintain the quality of the fluids and to prevent the receiving body from entering a state of thermal shock upon introduction of the intravenous fluid.

However, there are a number of challenges in making and using cabinets of this type. For one, when items are placed within the internal chamber, the cabinets may have an uneven item load. This can result in internal thermal gradients and uneven warming of the items in the cabinet. Additionally, production and/or maintenance of these cabinets may be time consuming or costly. Depending on the particular cabinet, specific parts may need to be stocked or ordered for different cabinet models.

Hence, a need exists for an improved heating cabinet with a flexible construction that is also easily assembled.

SUMMARY OF THE INVENTION

The present invention provides a heating system with a flexible construction that is easily assembled. The disclosed heating system may be adapted to include a number of heating elements which may be attached at various locations around a cabinet. These heating elements are universally connectable to a controller which independently monitors the temperature of the zone corresponding to each of the heating elements and compensates for the load variations across the cabinet. Additionally, if the heating elements fail, then the heating elements are also easily replaceable given their attachment configuration.

According to one aspect, a heating system is disclosed. The heating system includes a cabinet, one or more heating pad subassemblies, and a plurality of couplings. The cabinet has walls defining an interior heating chamber. The heating pad subassembly is disposed on an exterior surface of the walls of the cabinet, includes a heating element, and has a plurality of openings formed there through. The plurality of couplings include a plurality of coupling first portions disposed on the exterior surface of the walls and a plurality of coupling second portions coupled to the plurality of coupling first portions. At least a portion of the plurality of couplings extend through the plurality of openings in the heating pad subassembly, thereby coupling the heating pad subassembly to the cabinet.

In some forms of the heating system, a sensor may be attached to an exterior surface of the walls. The heating pad subassembly may further include a sensor aperture formed there through that is adapted to receive the sensor. Accordingly, when the heating pad subassembly is placed over the sensor, the sensor is accessible from the back side of the heating pad subassembly (i.e., the side of the subassembly not facing the exterior surface of the walls of the cabinet). This sensor aperture may be centrally disposed on the heating pad subassembly. In some forms, the sensor may be attached to the exterior side of the walls via a bracket and the sensor aperture formed through the heating pad subassembly may be sized and/or shaped to match the bracket.

In some forms, the sensor could also be incorporated into the heating element(s) or heating pad subassembly. One potential advantage of including the sensor in the heating pad subassembly is that the position of the sensor with respect to the rest of the heading pad subassembly is predetermined. This means that the sensor will be accurately placed during the action of attaching the heating pad subassembly to the wall.

There may be a plurality of heating pad subassemblies and a corresponding plurality of sensors. In this case, the heating system may further include a controller in electrical communication with the heating elements and the sensors. This controller may be configured to independently monitor temperature measurements from each of the sensors and may further be configured to independently control each of the heating elements.

The plurality of coupling first portions may be pins and the plurality of coupling second portions may be retaining clips. In one form, the pins may be welded to the walls.

The heating system may further include insulation such as, for example, a rigid fiberglass insulation. In the event there is insulation, the plurality of couplings may also extend through the insulation thereby also coupling the insulation to the cabinet. If insulation is present, then the heating pad subassembly may be sandwiched between the exterior surface of the walls of the cabinet and the insulation. In this arrangement, the plurality of coupling second portions may engage an outwardly facing surface of the insulation.

Although a number of types heating elements might be used, in some forms, the heating element may be, but need not be limited to, electrically resistive heating elements such as a silicone heated pad.

A method of making a heating system of the type described above is also disclosed. The method includes providing a cabinet having walls defining an interior heating chamber. A plurality of coupling first portions are attached on the exterior surface of the walls. A heating pad subassembly is placed on an exterior surface of the walls of the cabinet. This heating pad subassembly includes a heating element and a plurality of openings are formed through the heating pad subassembly. A plurality of coupling second portions are coupled to the plurality of coupling first portions to form a plurality of couplings. At least a portion of the plurality of couplings extend through the plurality of openings, thereby coupling the heating pad subassembly to the cabinet.

The method may further include the step of placing insulation on the heating pad subassembly before coupling a plurality of coupling second portions to the plurality of coupling first portions. Doing this can sandwich the heating pad subassembly between the exterior surface of the cabinet and the insulation.

In still other forms, the method may include the step of attaching a sensor to an exterior surface of the walls. In this case, the heating pad subassembly may further have a sensor aperture formed there through that is adapted to receive the sensor such that, when the heating pad subassembly is placed over the sensor, the sensor is accessible from a back side of the heating pad subassembly.

In still other forms, the heating element may be affixed with an adhesive.

In still other forms, the heating element may be affixed with a rigid plate that has a plurality of couplings.

In some forms, there may be a plurality of heating pad subassemblies and a corresponding plurality of sensors. In such cases, the method may further include the step of placing a controller in electrical communication with the heating elements and the sensors. This controller may be configured to independently monitor temperature measurements from each of the sensors and may further be configured to independently control each of the heating elements. This arrangement can assist in maintaining the temperature over the volume of the interior heating chamber even when uneven loads to be heated occupy the volume.

In some forms, the plurality of coupling first portions may be pins and the plurality of coupling second portions may be retaining clips. The method may further include the step of welding the pins to the walls.

Thus, this invention allows for more flexible construction and easier assembly of heating systems. Depending on the size and configuration of the cabinet, the heating pad subassemblies may be placed at various locations on the cabinet. As these heating pad subassemblies, and their corresponding sensors, are independently controlled and monitored, regardless of the exact placement of the pads, the controller is capable of operating the heating system so as to reduce thermal gradients that result from uneven load distribution. Particularly when the cabinet is made-to-order, this heating system accommodates various constructions with little or no modification to the basic heating components.

The disclosed heating system may also utilize common components across various models or sizes of cabinets, meaning that there is less need to have customized parts in the cabinet. For example, the same type of heating pad subassembly may be used in various sizes of cabinets (although larger volume cabinets may require more heating pad subassemblies to adequately heat the larger volume). Further, the controller may be configured to be operable in any of a number of different cabinets without the need to specifically program the controller based on the specifications of the heating cabinet. Programming controllers is a significant and time consuming part of construction and repair of heating systems.

These and still other advantages of the invention will be apparent from the detailed description and drawings. What follows is merely a description of the preferred embodiments of the present invention. To assess the full scope of the invention the claims should be looked to as the preferred embodiments are not intended to be the only embodiments within the scope of the claims.

DETAILED DESCRIPTION OF THE PREFERRED EMBODIMENTS

Figure 1:
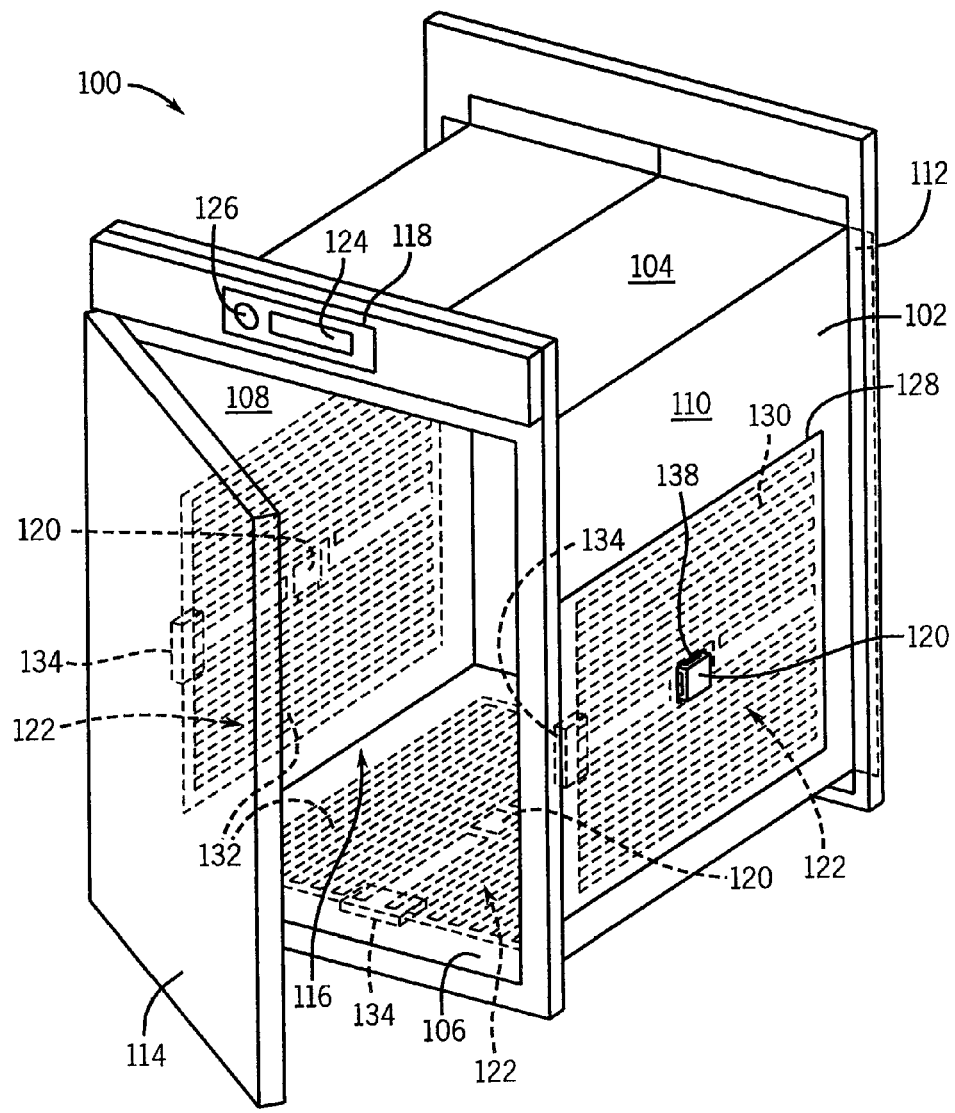
FIG. 1 a perspective view of a heating system.

Referring first to FIG. 1, a heating system 100 is shown. The heating system 100 may be used to warm items for a variety of applications. Some examples of items that may be heated include, but are not limited to, blankets, intravenous fluids, and food products.

The heating system 100 includes a cabinet 102 having a plurality of walls including a top wall 104, a bottom wall 106, a left wall 108, a right wall 110 and a rear wall 112. In the form shown, a door 114 is hingedly attached to the left wall 108. The door 114 may be opened to access the interior heating chamber 116 which is defined by the plurality of sidewalls and the door 114, when the door 114 is closed. There may be mechanisms that keep the door 114 closed such, for example, a biasing mechanism, a latch, or the like. This mechanism may assist in maintaining a seal (which may be a compressible gasket or the like) between the door 114 and the walls when the door 114 is closed.

In some forms, one or more shelves may be arranged in the interior heating chamber 116 to provide support for the items heated therein or to increase the capacity of the cabinet 102. One of the below-described heating pad subassemblies may be attached to the shelf to provide additional interior heating and to minimize any stratification in the cabinet 102. In other forms, support ledges may be affixed to the interior of the walls of the cabinet 102 for receiving insertable trays or the like.

Figure 2:
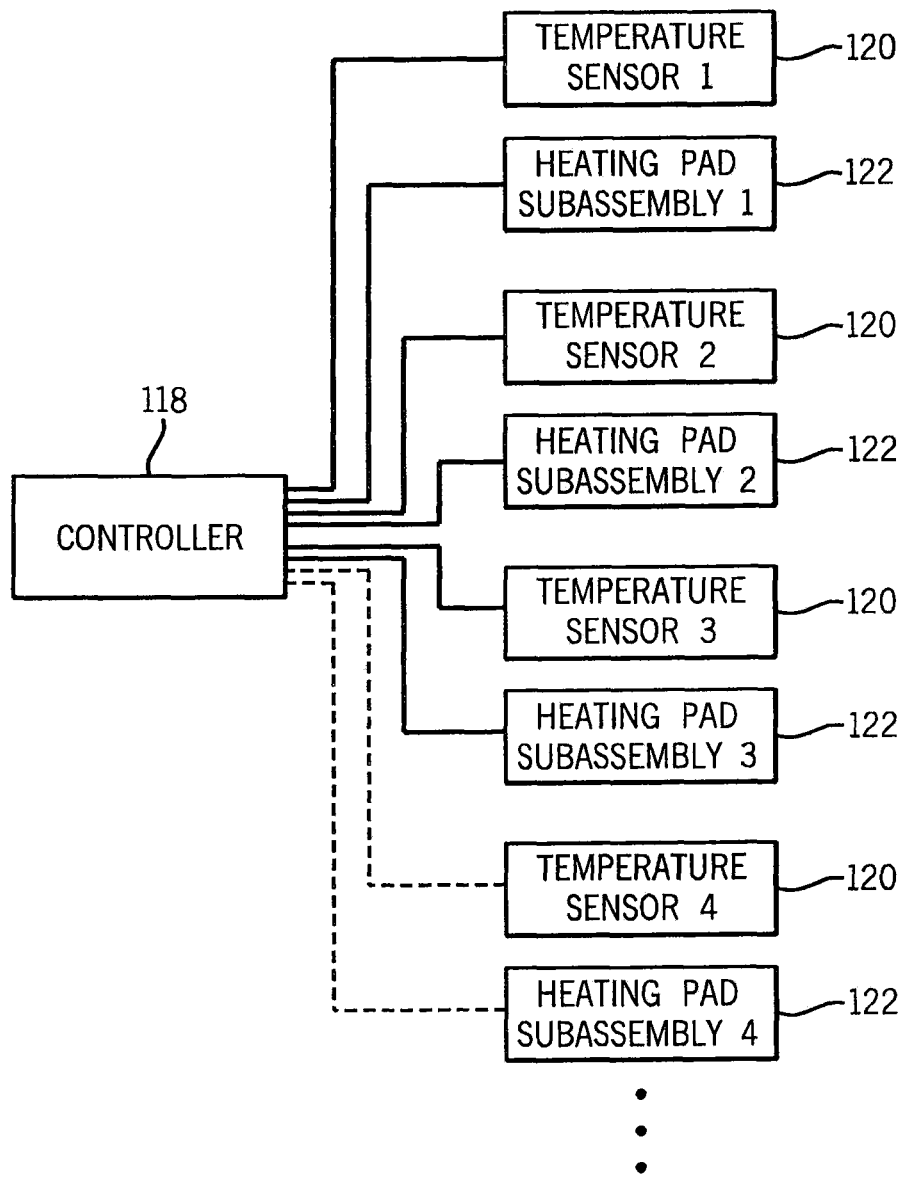
FIG. 2 is a schematic illustrating the connectivity of the various components of the heating system.

Now with additional reference to FIG. 2, the heating system 100 includes a controller 118 that is in electrical communication with a number of temperature sensors 120 and a corresponding number of heating pad subassemblies 122. The controller 118 is configured to independently monitor the temperature from each of the temperature sensors 120 and is further configured to independently control the heating element(s) in each of the heating pad subassemblies 122.

The controller 118 may include a number of ports for receiving connectors attached to electrical cables which connect to the temperature sensors 120 and their corresponding heating pad subassemblies 122. It is contemplated that the heating system 100, given its flexibility, may accommodate for various numbers of temperature sensors 120 and heating pad subassemblies 122 to satisfy the watt density requirements of the cabinet 102. For example, a cabinet of small volume may only need three heating pad subassemblies 122 to sufficiently warm the interior of the cabinet. However, a cabinet of larger volume may need more heating pad subassemblies 122 to maintain the temperature of the larger volume. Even in small cabinets, it may be preferable to include more heating pad subassemblies to provide a more even heating profile and/or minimize the load on the heating elements to improve their operating life. In any event, the controller 118 may have a number of ports for receiving temperature sensors 120 and/or heating pad subassemblies 122, but in the event that not all of the ports are occupied, then the controller 118 may be configured to operate using only the attached temperature sensors 120 and heating pad subassemblies 122.

To indicate that the controller 118 need not utilize all of the available ports, FIG. 2 includes dashed connections to indicate that some of these sensors 120 and heating pad subassemblies 122 may be omitted even if ports/connectors are available. Of course, the fact that three sets of solid lines indicate connections in FIG. 2 is intended to be illustrative, and in no way limiting.

It is contemplated that the specific connectivity of the controller 118 to the temperature sensors 120 and the heating pad subassemblies 122 may be direct or indirect. For example, given the power required to operate the heating pad subassemblies 122, the heating pad subassemblies 122 may be connected to a separate power supply (not shown) which is in separate communication with the controller 118. This power supply, at the instruction of the controller 118, may independently control the operation of the heating pad subassemblies 122.

The controller 118 may have a user interface including a display 124 and one or more controls 126. The display 124 may be used to show current operating conditions (i.e., the temperature of one or more of the heated zones) of the cabinet 102 or may be used in conjunction with the controls 126 to set a setpoint temperature of the interior heating chamber 116 or of the individual heating pad subassemblies 122.

In the form shown in FIG. 1, a number of heating pad subassemblies 122 are attached to the outside of the walls of the cabinet 102. As seen in FIG. 1, heating pad subassemblies 122 are attached to the left wall 108, the right wall 110, and the bottom wall 106. Given the tendency of the generated heat to rise, this placement may be beneficial as the heat produced proximate the bottom of the cabinet 102 will rise to the top, rather than be lost. However, the heating pad subassemblies 122 and their corresponding temperature sensors 120 may be differently located on the outside of the cabinet 102.

Each of the heating pad subassemblies 122 include both a pad 128 and a heating element 130 which is coupled to the pad 128. The heating element 130 may be placed between layers of the pad 128, or may be affixed to the a side of the pad 128. In some forms, the heating element 130 is an electrically resistive thermal cable which snakes though the pad 128. When a current is run through the thermally resistive heating element, the electrical resistance causes a controlled warming of the cable. In this form, the pad(s) 128 may be electrical insulators such that the current run through the heating element 130 alone. However, other types of heating elements 130 may be coupled to the pad(s) 128 instead of using a thermal cable such as, for example, a resistive film which has been etched to provide a pattern which carried in or by the pad 128.

The pad 128 has an attachment face 132 which is coupled to the exterior surface of one of the walls or, in some forms, a interior shelf. The attachment face 132 may be attached to the exterior surface of one of the walls of the cabinet 102 in a number of ways. According to one preferred form, the attachment face 132 of the pad 128 is attached via an adhesive. The adhesive is selected such that, at the operational temperatures of the heating elements 130, the adhesive does not melt or degrade, causing the decoupling of the attachment face 132 of the pad 128 from the wall of the cabinet 102.

The attachment face 132 of the pad 128 may be coupled to the walls of the cabinet 102 in other ways either separately or in combination with adhesive attachment including, for example, mechanical fasteners. Mechanical fasteners may be deemed appropriate when the operational temperatures of the heating system 100 are sufficiently high to preclude the use of standard adhesives. An example of mechanical couplings being used to attach a heating pad subassembly to the walls without the use of adhesive will be described below with reference to FIGS. 3 through 6.

In the form shown, the heating pad subassembly 122 further contains a connector 134 which may be used to connect via an electrical cable the heating elements 130 of the pads 128 to an electrical source, such as a power source, which may be separate from or integrated into the controller 118.

The heating pad subassemblies 122 are modularly heated pads with circuits designed into them to accept 120 volt or 230 volt power. By including circuits that allow the heating pad subassemblies 122 to accept either type of power, this eases manufacturing requirements of the heating pads and provides manufacturers with the ability to quickly build units to various voltage requirements around the world with minimal change to production flow. During assembly, the heating pad subassemblies 122 are located and placed on the exterior walls of the cabinet 102 and then the power connections are attached to the connector 134 to electrically connect the heating pad subassembly 122 to the controller 118.

Proximate the center of the heating pad subassembly 122 there is an sensor aperture 136. As best seen in FIG. 1, a sensor bracket 138 is mounted to the exterior surface of the sidewalls of the cabinet 102 and, when the attachment face 132 of the heating pad subassembly 122 is attached to the exterior surface of the sidewall, the sensor aperture 136 is placed around the sensor bracket 138. This structure permits easy access to the sensor bracket 138 for installation of one of the temperature sensors 120, even when the heating pad subassembly 122 has already been coupled to the outside of the cabinet 102. Alternatively, an adhesive tape may be used to place the temperature sensors 120 on the wall. In many cases, using an adhesive tape to place the sensor may be preferable because of the reduced cost of tape and the minimal amount of time required to attached the sensor on the wall during assembly.

One of the temperature sensors 120 is received in the sensor bracket 138. As the sensor bracket 138 is centrally located with respect to the corresponding heating pad subassembly 122, the temperature sensor 120 will provide an accurate reading of the temperature of the adjacent wall. In some forms, the temperature sensor 120 may be received into an opening in the wall or be embedded in the wall to improve the accuracy of the reading. The sensor bracket 138 and temperature sensor 120 are placed against the wall prior to the attachment of the heating pad subassembly 122 such that when the heating pad subassembly 122 is attached to the outer surface of the wall, the sensor bracket 138 and temperature sensor 120 are trapped against the wall. This greatly reduces the assembly time of the heating system 100 and the parts needed for installation.

The controller 118 may be configured to sense whether an available connections has been made and make a determination automatically as whether to monitor or operate the particular connection. In this way, the heat zones are established and operated by the connection of the sensors 120 and/or heating pad assemblies 122 to the cabinet 102. This design advantageously provides an even blanket of warmth independent of the load in the cabinet 102. For example, if the load to be warmed is shifted to the one side of the cabinet 102, then the loaded side will reach the set point and be maintained at the desired set point. Concurrently, the other side (which does not include the load) will separately be maintained at the desired set point by the controller 118. This configuration ensures that none of the surfaces exceed the desired set point temperature which may happen in some cabinets if all of the heating elements continue to run when even one of the elements is below the desired set point temperature.

The improved blanket of warmth also improves the safety of operation. The even heating ensures that one side is not likely to overheat in the interior heating chamber 116. Further, for heating of fluids where spoilage may occur above or below certain temperature limits, this even blanket of warmth helps to ensure that some of the fluids being warmed will not exit the acceptable temperature range.

The disclosed heating system also saves energy. As the controller 118 only independently controls the heating pad subassemblies to be operated when the independently monitored temperature sensors indicate that heating is necessary, only the heating pad subassemblies which need to be operated to warm a particular zone of the cabinet will be operated.

At certain operating temperatures, adhesive may not be viable mode of attachment as the adhesive may be heated to a temperature at which constituents in the adhesive break down, compromising the attachment. Turning now to FIGS. 3 through 6, another heating system 200 is illustrated, but in which the adhesive attachment described above with respect to FIG. 1 has been replaced with a mechanical coupling. At the onset, it should be appreciated that while only a single heating pad subassembly 222 is shown as being attached to the wall in FIGS. 3 through 6, that the heating system 200 may include multiple heating pad subassemblies 222 attached to the cabinet 202 as in the embodiment depicted in FIGS. 1 and 2 and that the temperature controller/temperature regulation system for multiple heating pad subassemblies as found in the above description could be readily applied to the cabinet 200 to create an even blanket of warmth.

In FIGS. 3 through 6, similar reference numerals are used to identify like items from FIGS. 1 and 2. However, in FIGS. 3 through 6, the hundreds digit of the reference numeral has been increased from "1" to "2" to indicate the item is part of the second illustrated embodiment. For example, heating pad subassembly 122 in FIGS. 1 and 2 corresponds to heating pad subassembly 222 in FIGS. 3 though 6. The descriptions of the items above in FIGS. 1 and 2 apply to the corresponding items identified below in FIGS. 3 through 6.

Figure 3:
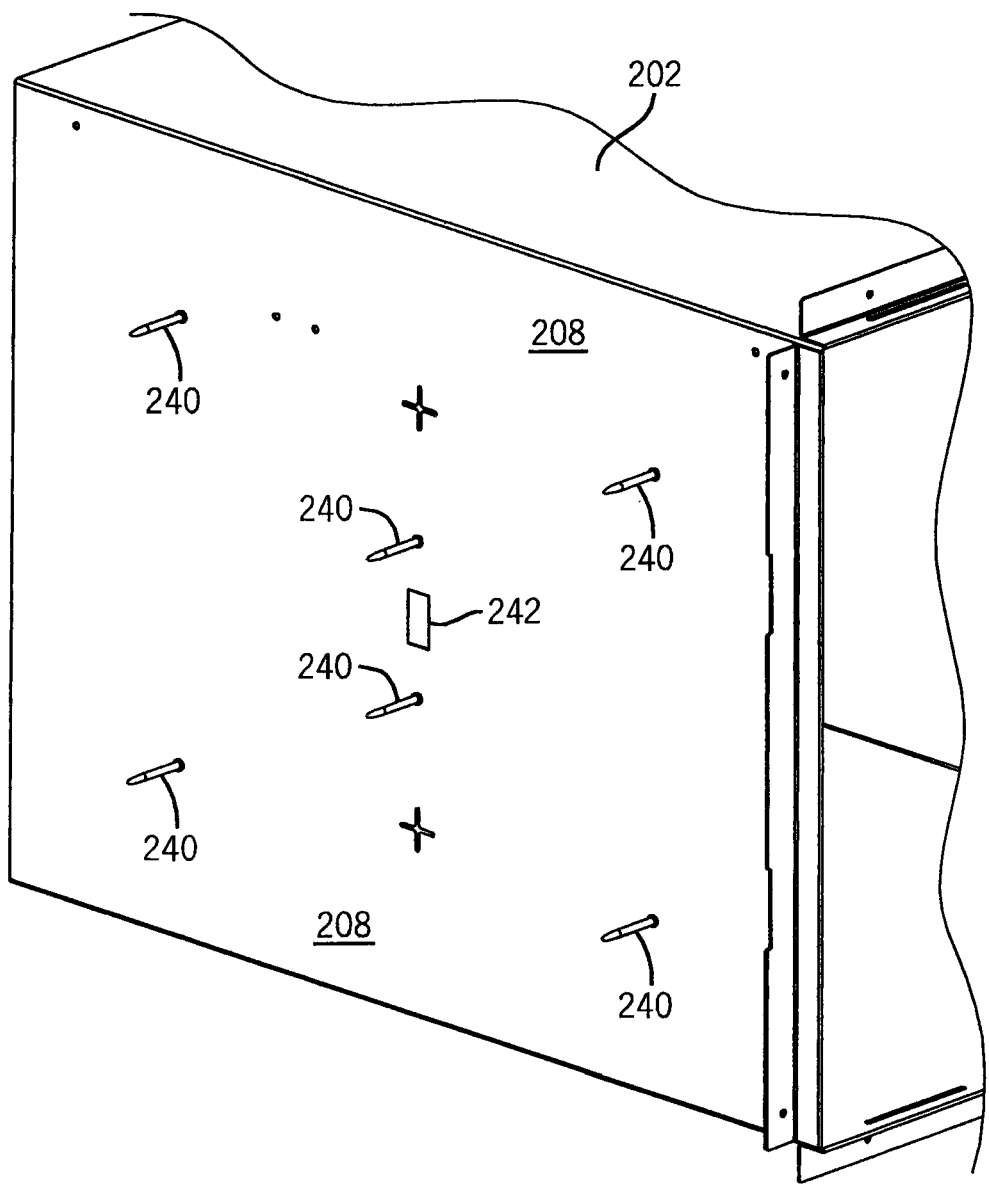
FIGS. 3 through 5 illustrate the steps of assembling a heating system in which a heating pad subassembly and insulation is attached using mechanical couplings.

Looking first at FIG. 3, a left wall 208 of a cabinet 202 similar to cabinet 102 is depicted without a heating pad subassembly yet having been attached. In the depicted second embodiment, however, a plurality of coupling first portions 240 are disposed on the left wall 208. As illustrated, the plurality of coupling first portions 240 are six pins which are welded to the wall 208 and generally project outwardly and perpendicularly there from on the exterior side of the wall 208 (relative to the internal heating chamber). In the form shown, each of the pins have a terminal end disposed away from the wall 208.

In the exemplary embodiment illustrated, four of the pins are arranged in a generally rectangular configuration, with each of the pins generally corresponding to one of the corners of the heating pad subassembly 222 that will be attached. Additionally, two of the pins are proximate a central location 242 for receiving a temperature sensor. In some forms, this central location 242 may be recessed in the wall, although in others although it need not be.

It should be appreciated that although six pins are depicted as being welded to the wall, that other quantities and types of coupling portions might be disposed on the wall and that the coupling portions may be linked to the wall in other ways. For example, in some forms, the wall may have threaded holes and the pins may have a threaded end which is received in the holes.

Figure 4:
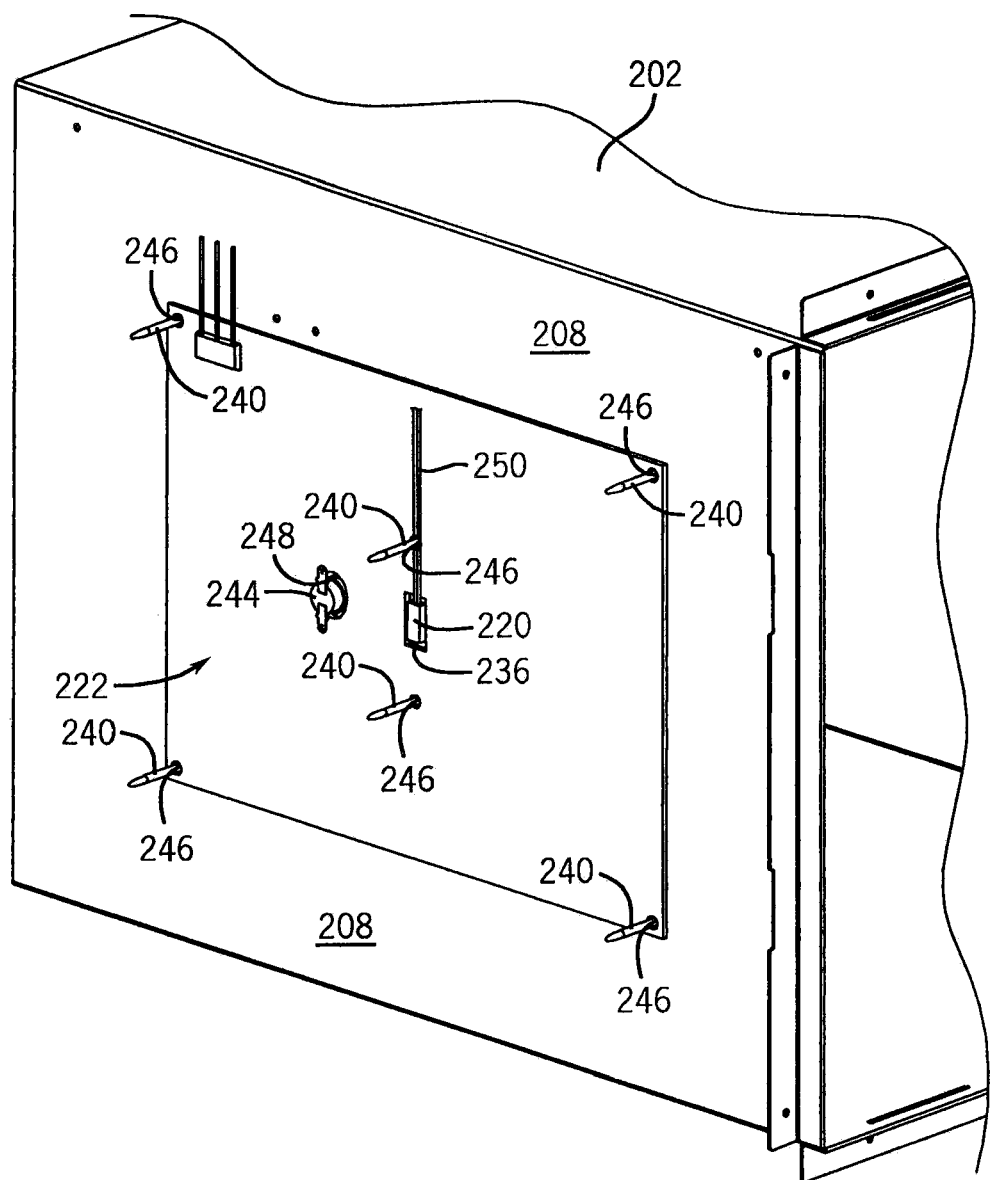

Now with reference to FIG. 4, a heating pad subassembly 222, a temperature sensor 220, and a high limit sensor 244 (which may serve as a safety switch to shutoff the power to the heating elements if an overheating condition is detected) are depicted as being disposed along the exterior surface of the wall 208. Notably, although the temperature sensor 220 and the high limit sensor 244 are directly coupled to the exterior surface of the wall 208, their connections and/or wiring are accessible through the back side of the heating pad subassembly 222 for easy access during installation and maintenance.

With respect to the heating pad subassembly 222, the heating pad subassembly 222 has a plurality of openings 246 formed there through. These openings 246 correspond to the placement of the first coupling portions 240 and, as the heating pad subassembly 222 is moved into place against the wall 208, the coupling portions 240 or pins are inserted into and extend through the openings 246 thereby locating and positioning the heating pad subassembly 222 with respect to the wall 208.

Additionally, the heating pad subassembly 222 includes a sensor aperture 236 and a high limit sensor aperture 248 which are centrally disposed in the heating pad subassembly 222 for accommodating the temperature sensor 220 and the high limit sensor 244. By inclusion of these apertures in the heating pad subassembly 222, the temperature sensor 220 and the high limit sensor 244 can be centrally placed relative to the heating element(s) contained in the heating pad subassembly 222 to provide more accurate readings. These apertures 236 and 248 may serve as a type of template to position the sensors 220 and 244 relative to the heating pad subassembly 222.

Moreover, wires such as wires 250 extending from the temperature sensor 220 may be run outside of the space between the attachment face of the heating pad subassembly 222 and the wall 208. This can reduce the thermal exposure of these wires and further make replacing them and/or connecting them easier.

Figure 5:
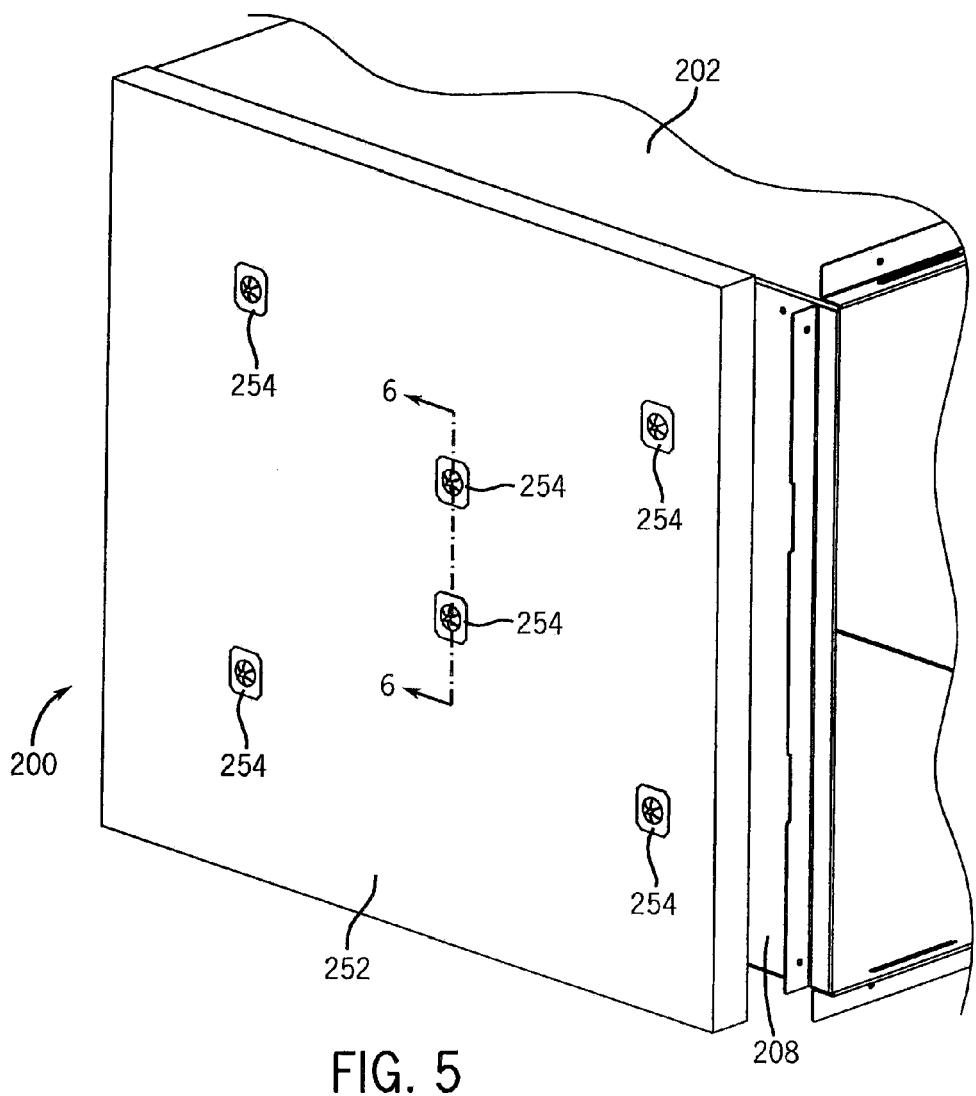
Figure 6:
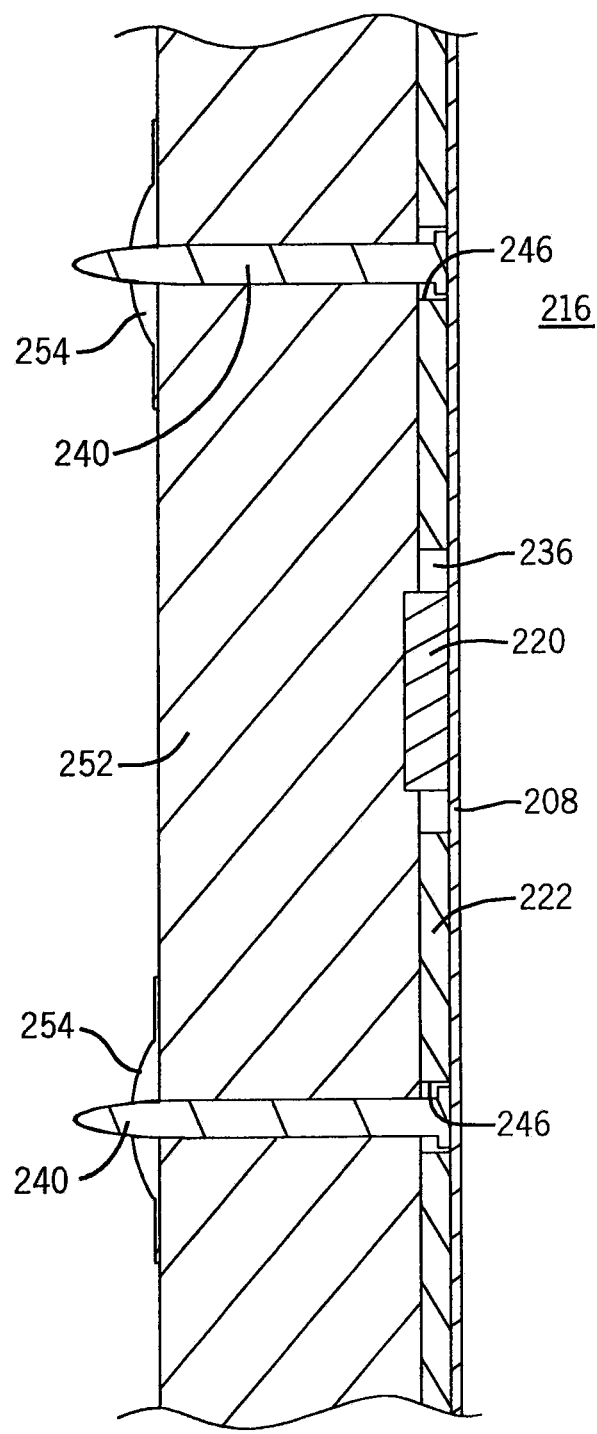
FIG. 6 is a cross-sectional side view taken through line 6-6 of FIG. 5.

Now with additional reference to FIGS. 5 and 6, after the heating pad subassembly 222 and sensors 220 and 244 are placed on the pins, a layer of insulation 252 (which may be a rigid insulation) is placed over these items and a plurality of second coupling portions 254 are coupled to the exposed terminal ends of the plurality of first coupling portions 240 to form a corresponding plurality of couplings. When this is done, the insulation 252 sandwiches the heating pad subassembly 222 between itself and the wall 208.

In the form illustrated, the second coupling portions 254 are spring clips. The spring clips are made of a spring steel and have a outer flange with a central opening and radially inwardly facing fingers. The central opening is moved over the terminal end of the pin until the fingers are press fit around the corresponding pin. At this point, the outer flange will engage the insulation 252 and effectively retain the insulation 252 over the heating pad subassembly 222 thereby capturing the heating pad subassembly 222 against the wall 208. Any force that would tend to cause the spring clips to move outwardly off of the pins would have the effect of causing the ends of the fingers to hook or move into the radially outward wall of the pins. This interaction generally inhibits their disengagement from one another.

Thus, the pins and clips both support the heating pad subassembly 222 and the insulation 252 as well as retain the insulation 252 against heating pad subassembly 222. Other types of mechanical couplings could also extend through the openings 246 in the heating pad subassembly and the insulation 252.

It will be appreciated that other mechanical forms of attachment may also be used to attach the heating pad subassembly to the wall in conjunction with or apart from the methods disclosed above. In one alternative form of mechanical attachment (not shown), a rigid plate may be used to retain the heating pad subassembly against the wall of the cabinet. In this form, the heating pad subassembly may be positioned with respect to the outside of the wall and the rigid plate placed over all or at least a part of the heating pad subassembly to sandwich the heating pad subassembly between the wall and the rigid plate. Then, the plate may be held in place by, for example, clips, pins, other fasteners, or by soldering or welding. In still another alternative form of mechanical attachment (not shown), cable hangers may be used to support a heating pad subassembly on the wall.

Accordingly, a heating system is disclosed which operates efficiently, is easy to assemble, and allows for flexibility of cabinet design with similar heating components. By providing a controller that independently monitors and controls various zones of the cabinet, an even blanket of warmth may be provided. This minimizes the energy use of the cabinet while still ensuring that the items contained in the cabinet are properly warmed.

Moreover, in a system including a number of attached heating pad subassemblies, when one of the subassemblies needs replacement, the other subassemblies are automatically configured to compensate until there is an opportunity to replace the worn out or damaged heating pad subassembly. Particularly when the heating system is in service and it would be inconvenient immediately repair or replace the out-of-service heating pad subassembly, this allows the system to continue to be used with little, if any impact on the performance of the heating system. Then, at a more preferable time, the heating system may be serviced.

It should be appreciated that various other modifications and variations to the preferred embodiment can be made within the spirit and scope of the invention. Therefore, the invention should not be limited to the described embodiment. To ascertain the full scope of the invention, the following claims should be referenced.

What is claimed is:

1. A heating system comprising:
    a cabinet having at least two opposed inner walls defining an interior heating chamber and a door to allow access to the interior, the facing inner surfaces of the opposed inner walls being substantially uninsulated to provide heat transfer through the walls to air contained therebetween within the interior heating chamber;
    a heating pad subassembly disposed on an exterior surface of the walls of the cabinet, the heating pad subassembly including a heating element and a plurality of openings formed through the heating pad subassembly;
    an insulation disposed on an exterior surface of the heating pad subassembly;
    a plurality of common couplings attached to the exterior surface of the walls, and wherein at least a portion of the plurality of couplings extend through the plurality of openings and wholly through the insulation so that the heating pad and insulation are receivable on the couplings by sliding therealong toward the exterior surface of the wall
    a plurality of retainers coupled to the outwardly extended end of the common couplings and positioned to compress the insulation along the common couplings against an outer surface of the heating pad subassembly; and
    at least two outer walls substantially parallel to and displaced out from a corresponding inner wall to contain the heating pad and insulation between an outer wall and corresponding inner wall.

2. The heating system of claim 1, further comprising a sensor attached to an exterior surface of the walls.

3. The heating system of claim 2, wherein the heating pad subassembly further includes a sensor aperture formed there through, the sensor aperture being adapted to receive the sensor such that, when the heating pad subassembly is placed over the sensor, the sensor is accessible from a back side of the heating pad subassembly.

4. The heating system of claim 3, wherein the sensor aperture is centrally disposed on the heating pad subassembly.

5. The heating system of claim 3, wherein the sensor is attached to the exterior side of the walls via a bracket and wherein the sensor aperture formed through the heating pad subassembly is sized to match the bracket.

6. The heating system of claim 1, wherein the plurality of common couplings are pins.

7. The heating system of claim 1, wherein the common couplings are welded to the walls.

8. The heating system of claim 1, wherein the plurality of retainers engage an outwardly facing surface of the insulation to provide a smooth surface.

9. The heating system of claim 1, wherein the insulation is a rigid fiberglass insulation.

10. The heating system of claim 1, wherein the heating pad subassembly is a silicone heated pad.

11. The heating system of claim 1, wherein the insulation is a rigid foam insulation.

12. The heating system of claim 1, wherein the insulation has a plurality of openings formed through the insulation whereby the openings receive the common couplings.

13. The heating system of claim 1, wherein the pins are sharpened to allow the pin to puncture through the rigid insulation.

14. The heating system of claim 1, wherein at least a portion of the plurality of common couplings are centrally disposed on the exterior surface of the wall.

15. A method of making a heating system, the method comprising:
    providing a cabinet having at least two opposed inner walls defining an interior heating chamber and a door to allow access to the interior, the facing inner surfaces of the opposed inner walls being substantially uninsulated to provide heat transfer through the walls to air contained therebetween within the interior heating chamber;
    attaching a plurality of common couplings on the exterior surface of the walls;
    placing a heating pad subassembly on an exterior surface of the walls of the cabinet, the heating pad subassembly including a heating element and a plurality of openings formed through the heating pad subassembly by sliding the heating pad along the couplings:
    placing an insulation on an exterior surface of the heating pad subassembly by sliding the insulation along the couplings;
    covering the heating pad and insulation on the coupling as attached to the at least two opposed inner walls with at least two outer walls substantially parallel to and displaced out from a corresponding inner wall to contain the heating pad and insulation between an outer wall and corresponding inner wall; and
    wherein at least a portion of the plurality of common couplings extend through the plurality of openings and the insulation thereby coupling the heating pad and insulation to the cabinet.

16. The method of claim 15, further comprising the step of attaching a sensor to an exterior surface of the walls and wherein the heating pad subassembly further includes a sensor aperture formed there through, the sensor aperture being adapted to receive the sensor such that, when the heating pad subassembly is placed over the sensor, the sensor is accessible from a back side of the heating pad subassembly.

17. The method of claim 15, wherein the plurality of common couplings are pins and further comprising the step of welding the pins to the walls.

18. The method of claim 15, wherein the insulation is a rigid foam insulation.

19. The method of claim 15, wherein the insulation is a rigid fiberglass insulation.

20. The method of claim 15, further comprising the step of placing a retainer on the outwardly extended end of the common couplings and positioned to compress the insulation along the common couplings against an outer surface of the heating pad subassembly.

\* \* \* \* \*